United States Patent Office 3,042,791
Patented July 3, 1962

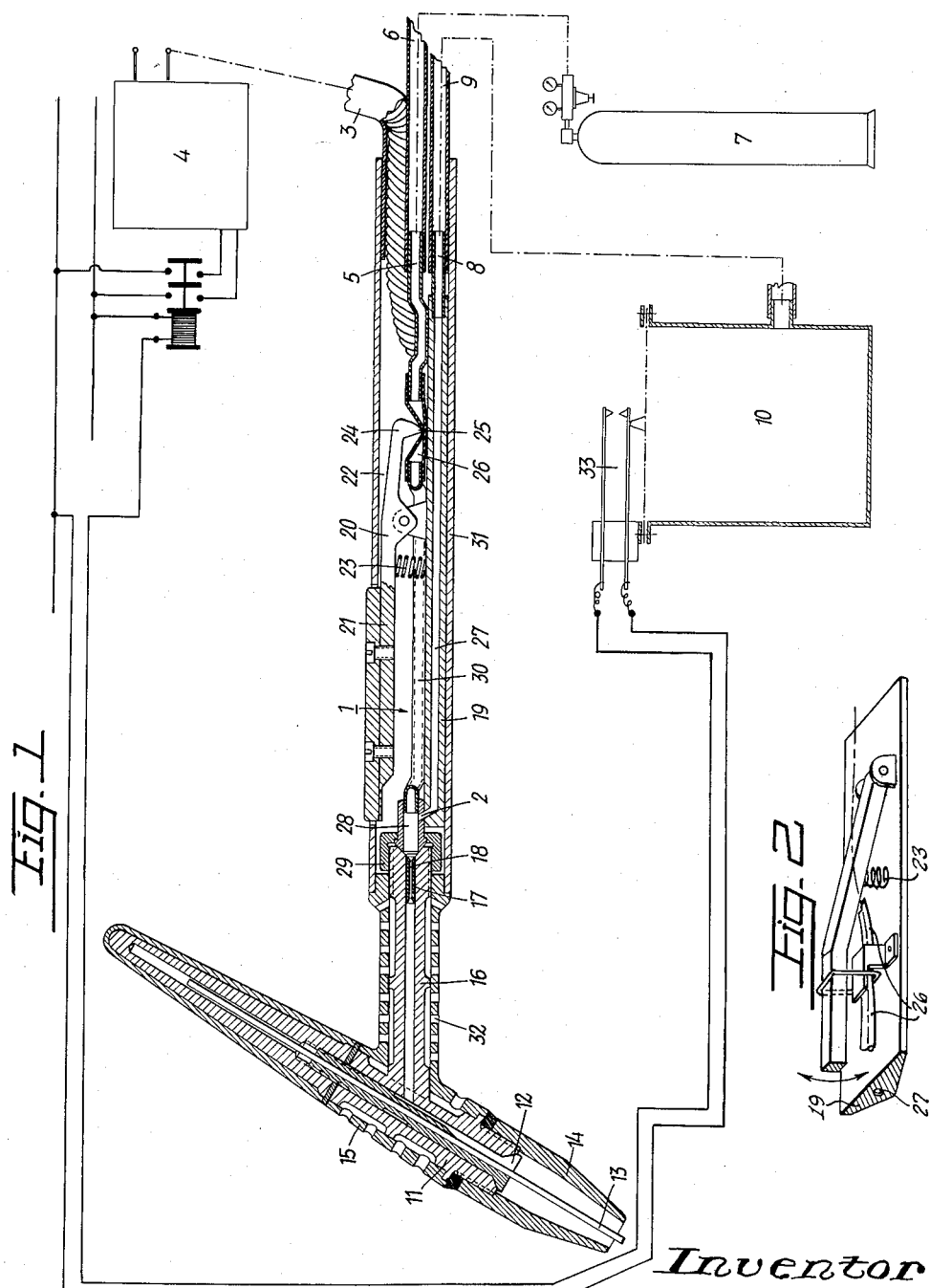

3,042,791
APPARATUS FOR SHIELDED ARC WELDING
Olaf Reeh, 1 Adalbert-Stifter-Strasse, Munich-Unterpfaffenhofen, Germany
Filed Aug. 31, 1959, Ser. No. 837,192
Claims priority, application Austria Sept. 29, 1958
4 Claims. (Cl. 219—75)

This invention relates to apparatus for welding metals by means of a protective gas-shielded arc produced between a preferably nonmelting electrode and a workpiece.

It is an object of the invention to ensure the supply of the protective gas for a certain time before the beginning of the welding operation and after shutting down the torch, which time will be sufficient to effectively prevent an oxidation of the electrode while preventing a discharge of unnecessarily large quantities of expensive protective gas from the torch. For this purpose the invention relating to apparatus for welding with preferably nonmelting electrodes which are shielded by protective gas in a welding torch, which is provided with a valve for interrupting the supply of the protective gas from a supply container, proposes so to construct the valve that it is self-closing to interrupt the gas supply when the torch is shut down. The torch is connected to a pressure-responsive switch and/or a receiver for the protective gas by a branch conduit which is connected to the supply conduit for the protective gas at a point behind the self-closing valve.

A construction of the self-closing valve which has proved satisfactory comprises a double-armed lever, one arm of which extends partly out of the handle of the torch under the pressure of a spring so that it will be automatically depressed during normal use by the operator's hand enclosing the handle, whereas the other arm of the lever has a hooklike knife edge, which is adapted to pinch an elastic hose, e.g., of rubber, inserted in the supply conduit for the protective gas, under the action of the spring.

Another advantage is afforded by the arrangement of a throttle in the supply conduit for the protective gas behind the branch conduit leading to the receiver. This throttle consists preferably of an elongated nozzle and is made from highly heat-conductive material.

Finally the apparatus according to the invention enables the control of currents in that the receiver for the protective gas is advantageously provided with an electric switch responsive to the pressure in the receiver. This enables a control of operations which are related to the welding process, such as the closing and opening of the circuit for the welding current, as well as the switching of high-frequency current.

An illustrative embodiment of an apparatus according to the invention will be explained more fully hereinafter with reference to the drawing.

FIGURE 1 is a view showing an apparatus constructed in accordance with the teachings of my invention.

FIGURE 2 is a fragmentary view of a modification of the torch valve shown in FIGURE 1.

The welding torch according to the invention is generally designated with 1 and is connected by a power cable 3 to an electric power source 4. The torch has an inlet 5 for receiving the protective gas through a conduit 6 from the supply cylinder 7. A second inlet 8 enables the torch 1 to be connected by a conduit 9 to a receiver 10 and to a pressure-responsive switch 33.

The torch is air-cooled and designed for high loads without excessive temperature rise of the elastic hose contained in the handle, which hose is suitable only for a low thermal load, and of those parts of the torch which are to be gripped by the operator.

The torch head 11 forms a support for the electrode 13 held in the usual manner by a collar 12, and for the ceramic nozzle 14 and is surrounded by insulation 15. The torch tip is welded to an adapter 16, which has a bore extending in its longitudinal axis and which serves for supplying the welding current as well as the protective gas. At its end remote from the torch tip 11 the adapter 16 has soldered therein a Pitot tube 17. The length and diameter of the tube bore 18 can be selected to throttle the supply of protective gas to the desired degree. In any case the throttle causes a strong drop in the pressure of the protective gas. A body 19 secured by a screw connection to the adapter 16 serves to feed the open-circuit and operating voltages from the power cable 3, soldered to this body 19, to the adapter 16 and thus to the electrode 13. For this purpose and to ensure a rapid dissipation of heat generated in the adapter 16 the body 19 is amply dimensioned and made from highly heat-conductive material.

A double-armed lever 20 is pivoted to the body 19. One arm 21 of this lever has an actuating element screwed thereto and protruding somewhat beyond the surface of the handle 22. This arm 21 is under the action of a compression spring 23. The other arm 24 of the lever has a hook-shaped free end formed with a knife edge 25. Under the action of the spring 23 this knife edge acts on the resilient hose 26, e.g., of rubber, in the supply conduit 6 for the protective gas. It is apparent that the double lever 20 and the hose 26 cooperate to form a reliably acting shut-off valve for the supply conduit when the torch is out of use.

The body 19 has also a longitudinal bore 27, which opens into the supply conduit 6 for the protective gas behind the shut-off valve 20, 26 but before the Pitot tube 17. This longitudinal bore leads by way of the above-mentioned inlet 8 and the branch conduit 9 to the receiver 10. The opening 2 where the branch conduit 8 discharges into the supply conduit 6 for the protective gas is disposed in a nipplelike connecting piece 28, which is connected at one end to the adapter 16 with a cap nut 29 and at the other end to a tube 30 in the supply conduit 6. The tube 30 leads to the hose 26, which is a part of the automatically acting shut-off valve, as has been mentioned.

The torch is also provided with an outer shell 31 of plastic, which merges at its front end into the insulating member 15 for the adapter 16 and the torch tip 11. This insulating member may consist, e.g., of asbestos cement and is not in snug contact with the parts to be insulated. It is provided with openings 32 so that the circulation of air effects a cooling of the torch tip and adapter.

According to the invention the rising or falling pressure between the Pitot tube 17 and the shut-off valve is used to close or open a control circuit by means of a pressure-responsive switch 33 provided on the receiver 10. With the aid of appropriate electrical means this circuit may be utilized for controlling the flow of welding current or other operations related to the welding process. E.g., it may be used to control the high-frequency current additionally required for aluminium welding. The switch 33 may also be used to control strictly mechanical operations related to the welding process.

The protective gas supplied flows through the supply conduit 6 and the open valve to the connecting piece 28 and thus before the Pitot tube 17. From here a portion of the gas flows through the branch conduit 9 into the receiver 10 whereas another portion flows through the tube 17, which causes a strong pressure drop, to the torch tip. As soon as the pressure in the reservoir 10 has reached a predetermined value the pressure-responsive switch 33 will close the circuit of the operating current and the arc can now be struck and will be shielded by protective gas.

When the operator lays the torch aside the shut-off valve 20, 26 will interrupt the further supply of protective gas from the supply cylinder 7. An adequate amount of protective gas will then flow from the receiver 10 through the branch conduit 9 and the Pitot tube 17 into the torch tip 11 to prevent an oxidation of the electrode 13. The welding current has already been interrupted in response to the drop of pressure in the receiver 10.

Further measures are taken to improve the thermal properties of the torch according to the invention. E.g., the bore in the adapter 16 may be provided with a screw thread to increase the surface area thereof and improve the heat transfer to the protective gas flowing thereto. This means improved cooling; warm protective gas will enhance the quality of the weld. The torch tip and adapter consist of material of low thermal conductivity so that substantial quantities of heat are radiated from the outside of the torch and do not reach the body and handle. The arrangement of the Pitot tube contributes also to an improvement in the thermal conditions in the torch because the Pitot tube consisting of highly heat-conductive material transmits heat from the adapter quickly to the bore of the Pitot tube owing to the soldered joint so that this heat is transferred to the protective gas whereas the expanding protective gas has a cooling effect.

The shell 31 serving as a handle and the actuating lever 21 for the valve consist of electrically insulating material, usually plastic.

Finally, the length of the torch may be reduced to advantage if the double-armed lever for the self-closing valve is replaced by a one-armed lever which is also permanently loaded by a spring which is similar to the spring 23 and causes a clamping ring to urge the hose 26 in the supply conduit 6 for the protective gas against a stationary stop. This measure enables the use of a valve which is particularly short in length because the second lever arm is eliminated.

It may be mentioned that the apparatus according to the invention may be used also with water-cooled torches. In this case the current-carrying parts of the torch are usually made of copper and the electrical insulation consists of plastic.

The invention is also applicable to shielded arm welding units using consumable electrodes. In this case the collet is replaced by a contact tube of copper and the torch tip is replaced by a wire feed tubing, in which the welding wire is fed by a feeding device from a wire reel at a rate which equals to the melt-down rate.

What is claimed is:
1. An apparatus for shielded arc welding comprising a source of protective gas, a receiver for said gas, a torch including an electrode and a handle, a protective gas conduit connecting said source and said electrode, and in said handle an electric conduit for said electrode, an elastic hose forming part of said gas conduit, a valve controlling said hose, spring means normally holding said valve in hose closing position, an auxiliary conduit connecting said receiver with said gas conduit and opening thereinto at a place between said valve and said electrode, and a hand operated lever protruding from said handle and opening said valve when gripped by the operator and pressed against the handle.

2. Apparatus as claimed in claim 1 wherein said lever is a double arm lever, the first arm of which is pressed outwardly by said spring means, and the second arm of which carries a knife edge closing said hose conduit as long as said first arm is in the outwardly protruding position.

3. Apparatus as claimed in claim 1 comprising a throttle in the protective gas conduit intermediate said electrode and valve, a welding circuit for the electrode, and a pressure responsive switch controlling said welding circuit, said switch being controlled by the pressure variations in said gas conduit between said throttle and valve.

4. Apparatus as set forth in claim 1, in which said lever is a one-armed lever pivoted to said torch and adapted to engage said hose, a stationary stop carried by said torch adjacent to said hose on the side thereof opposite to said lever, a clamping ring carried by said lever, and a compression spring tending to urge said clamping ring against said hose to pinch the same against said stop so as to interrupt the flow of gas through said hose, said actuating means being operable to move said lever against the force of said spring to disengage said ring from said hose and thus to relieve said hose from said stop and open said valve.

References Cited in the file of this patent
UNITED STATES PATENTS

| | | |
|---|---|---|
| 2,428,065 | Cockrill et al. | Sept. 30, 1947 |
| 2,444,767 | Cobean | July 6, 1948 |
| 2,448,994 | McClary | Sept. 7, 1948 |
| 2,630,513 | Redmond | Mar. 3, 1953 |
| 2,695,944 | Donnelly | Nov. 30, 1954 |
| 2,862,098 | Hasselhorn | Nov. 25, 1958 |